July 11, 1944. J. L. HAMILTON 2,353,235
ELECTRIC MOTOR
Filed March 4, 1942 2 Sheets-Sheet 2
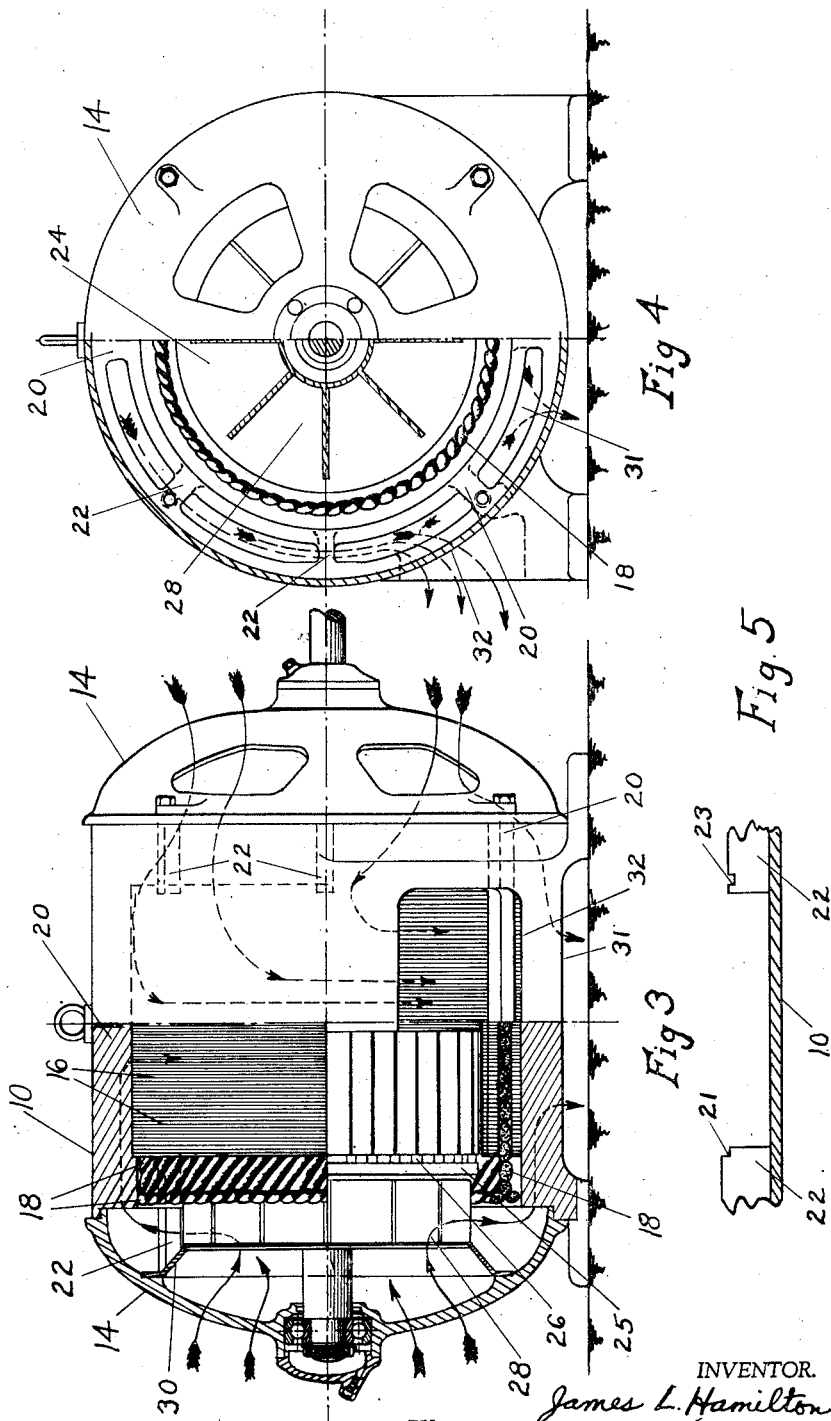
INVENTOR.
James L. Hamilton
Roy M. Eilers
BY Patented July 11, 1944

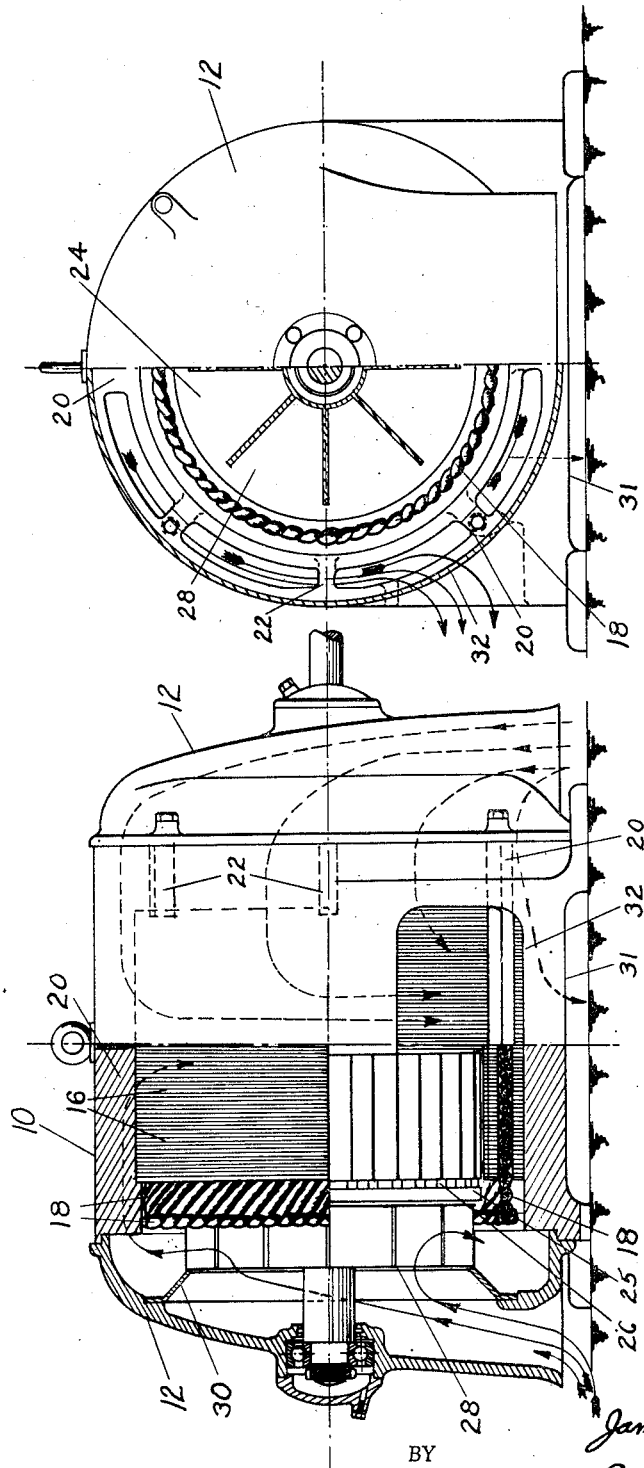

2,353,235

UNITED STATES PATENT OFFICE 2,353,235

ELECTRIC MOTOR

James L. Hamilton, Kirkwood, Mo., assignor to Century Electric Company, St. Louis, Mo., a corporation of Missouri Application March 4, 1942, Serial No. 433,248

4 Claims. (Cl. 172—36)

This invention relates to improvements in electric motors. More particularly, the invention relates to improvements in methods of cooling electric motors.

It is one object of the present invention to provide an improved method of cooling electric motors.

Electric motors generate heat when they are operated, because of electrical resistance and the friction therein. This heat should be removed as quickly and completely as possible, so it will not injure the various parts of the motor. Various methods have been used to remove this heat, and these methods generally consist of equipping the motor with a fan that blows air onto and around the parts of the motor. This air will usually contact the end faces of the rotor and stator, and perhaps a few parts of the frame. In some special constructions, the air will flow through specially formed channels or passages in the laminae of the stator, and will tend to cool the stator. The first method is objectionable because the air will contact portions of the motor that are not good radiators. The ends of the rotor and stator are thermally insulated, to some extent, from the rest of the rotor and stator, by the coating of oxide between the individual laminae. This oxide is primarily intended as electrical insulation, but it acts as heat insulation too. It limits the flow of heat from one lamina to another in the same way it limits the flow of electricity from one lamina to another. As a result, the cooling of the laminae at the ends of the rotor and stator cannot effectively cool the stator of the motor. The other method is objectionable because the provision of specially formed passages through the laminae of the stator is quite expensive, and does not give the desired cooling effect. These passages must be relatively small or the laminae must be made considerably larger than they need be made. If the passages are small, their radiating area will be small and their frictional resistance to the flow of air therethrough will be relatively high. If the passages and the laminae are large, the laminae will store a great deal of heat and passages will be unable to dissipate enough of the heat to permit the motor to run cool. Even if such construction could give proper cooling, it would be quite expensive to manufacture because unusual care would have to be taken to keep the passages in register when the laminae are assembled. For these several reasons, the present day methods of cooling electric motors are objectionable. The invention obviates these objections, by providing an improved method of cooling electric motors that comprises the cooling of the laminae of an electric motor without the necessity of forming passages through the laminae. The invention provides for the passage of air over the peripheries of the laminae, and thereby utilizes the full radiating effect obtainable from the peripheries of the laminae. It is, therefore, an object of the present invention to provide for the cooling of electric motors by passing air over the peripheries of the laminae of their stators.

In cooling electric motors, it is desirable to provide a plurality of short, relatively unobstructed passages through the motor for cooling air. Passages through the motor that are long and restricted to some extent, are not desirable because they have a great deal of resistance to the flow of cooling air therethrough. Furthermore, a long passage does not give adequate cooling because the air is heated during its passage through the inlet end of the passage and cannot remove the desired amount of heat from the outlet end of the passage because it is no longer cool. A long passage is additionally objectionable because, as in the case of a relatively obstructed path, it requires a larger horsepower fan to move air through it. This is objectionable. The invention obviates these objections by providing a plurality of relatively short unobstructed passages through the motor for cooling air. It is, therefore, an object of the present invention to provide a plurality of relatively short, unobstructed passages through an electric motor for cooling air.

Transfer of heat from one medium to another is facilitated where the radiating surface has a number of projections thereon. These projections act as individual radiators and materially assist the transfer of heat from the radiating surface to the medium in contact with the surface. The invention utilizes this principle in securing efficient cooling of electric motors by passing air over a surface which has a number of projections thereon. This surface consists of the outer peripheries of the laminae of the stator. The laminae are annular pieces of sheet metal that are made by punching them out of a larger sheet. As a result, their peripheries are not smooth, but are rough and have minute projections thereon. These projections are good radiators of heat. The flow of cooling air over the peripheries of the laminae that is provided by the invention, absorbs heat from the heat-radiating projections on the peripheries of the laminae and keeps the stator cool.

In cooling the parts of an electric motor, it is advisable to have short paths for the air. The invention provides short paths for the air by using a blower at each end of the shaft to move air toward an outlet in the middle of the motor. The use of two fans reduces the length of the paths for the air considerably, because the air need go only half the axial length of the motor.

Other objects and advantages of the invention will become apparent to those skilled in the art from an examination of the drawings and accompanying description.

In the drawings and accompanying description, two preferred embodiments of the invention are shown and described, but it is to be understood that the drawings and accompanying description do not limit the invention and the invention will be defined by the appended claims. For instance, the drawings and accompanying description relate to motors, but the invention may be applied to various kinds of rotative electrical equipment; and it is to be understood that for the purposes of this application, the word "motors" comprehends all rotative electrical equipments.

In the drawings,

Fig. 1 is a partial, cross-sectional, front elevational view of an electric motor that is made in accordance with the principles of the present invention.

Fig. 2 is a partial, cross-sectional, end view of the motor shown in Fig. 1.

Fig. 3 is a partial, cross-sectional, front elevational view of another motor that is made in accordance with the principles of the present invention.

Fig. 4 is a partial, cross-sectional, end view of the motor shown in Fig. 4, and Fig. 5 is an elevational view of a portion of one pair of the longitudinal laminae-supporting members provided by the invention.

The upper left-hand portions of Figs. 1 and 3 are cross-sectional views of the motor in which the casing of the motor has been removed, and they show the laminae of the stator. The lower left-hand portions of Figs. 1 and 3 below the upper left-hand portions, are cross-sectional views of the motor in which the casing and the laminae of the stator have been removed to show the rotor. In Figs. 2 and 4, the left-hand half of the end of the casing has been removed to show the ends of the rotor and stator.

Referring to the drawings in detail, the body of a housing for an electric motor is denoted by the numeral 10. This body 10 of the housing may be equipped with different end members. In Figs. 1 and 2, the body 10 is shown as it appears when it is equipped with splash proof end members 12. In Figs. 3 and 4, the body 10 is shown as it appears when it is equipped with open end member 14. The body 10 of the housing is substantially cylindrical in shape and has a plurality of longitudinal supporting members 20 and 22 on the inner surface thereof. The supporting members 20 extend uninterruptedly along the inner surface of the body 10, but the supporting members 22 extend along only a portion of the inner surface of the body 10. The supporting members 20 provide longitudinal passages for air between the outer periphery of the stator and the inner periphery of the body 10. The supporting members 22 not only provide longitudinal passages for air between the outer periphery of the stator and the inner periphery of the body 10, they also provide circumferential passages for air between the outer periphery of the stator and the inner periphery of the body 10.

The supporting members 20 and 22 not only form passages for air, they also support the stator of the motor. This stator consists of a number of annular pieces of metal 16 that are punched out from a metal sheet. These punchings have slots in them in which copper windings 18 are positioned. The inner ends of the left-hand supporting members 22 have recesses 21 that receive and hold the outer peripheries of laminae 16 forming the left-hand end of the stator. The stator is held tightly against the recesses 21 by a locking ring, not shown, that is forced into the grooves 23 in the right-hand supporting members 22. The locking ring and the recesses 21 hold the stator firmly in place. The ends of the left and right-hand supporting members 22 extend a very short distance over the end of the stator, but merely do so to provide adequate bearing between the stator and the members 22. For the most part, the periphery of the stator is not covered and can be contacted freely and almost completely by air passing through the motor.

Positioned inside of the stator is the rotor 24. This rotor may be of any suitable electrical design, but it has been shown, for convenience, to be a squirrel cage rotor having end rings 25 and bars 26. The rotor 24 also has two air-moving means 28 mounted thereon and rotatable therewith. These air-moving means 28 are located at opposite ends of the rotor 24 and draw air into their centers and expel it outwardly at their peripheries.

An annular baffle 30 is secured to each end of the end members 12 and 14 and is positioned so its inner periphery is adjacent to the outer periphery of the air-moving means 28. The baffles 30 enable the air-moving means to develop air pressure in the housing of the motor by preventing the escape of the air that is moved outwardly by the air-moving means 28.

The body 10 of the housing has a plurality of openings 32 therethrough that serve as outlets for the air passing through the passages in the motor.

The operation of the cooling system is quite simple, but it is very effective. It passes cool air over those portions of the motor that are good conductors and good radiators of heat. Air is drawn into the end members 12 and 14 by the air-moving means 28. In the case of the motor of Figs. 1 and 2 the air enters through the opening at the bottom of the end member 12. This air is directed by the baffles 30 into the blades of the air-moving means 28. The arrangement of the baffles 30 secures a uniform distribution of air into the air-moving means 28. The air is then forced outwardly by the air-moving means 28 against the copper wires 18. These wires preferably overlie at least a portion of the blades of the air-moving means 28, and are constantly being contacted and cooled by air flowing from the air-moving means 28. A part of the air then flows into the various longitudinal passages formed between the outer periphery of the stator and the inner periphery of the housing by the longitudinal supporting members 20 and 22. The air from one air-moving means will flow axially toward the center of the motor until it reaches the center and contacts the air approaching the center from the opposite direction under the influence of the other air-moving means 28. The air from the one air-moving means then mingles with the air from the other air-moving means 28 and will flow circumferentially down to the opening 32 where it leaves the housing. The rest of the air will flow through the passage at the bottom of the housing and will be expelled through the opening 31.

The air cools the ends of the copper wires 18 and then flows through the passages in the housing. In flowing through the passages between the outer periphery of the stator and the inner periphery of the body 10, the air absorbs heat from the stator and keeps the motor cool. The air flowing through these passages is in direct contact with the peripheries of the laminae and also in direct contact with the longitudinal supporting members that contact the peripheries of the laminae. The air not only directly removes heat from the surface of the laminae by actually contacting it, it removes heat indirectly from the surface of the laminae by cooling the longitudinal supporting members 20 and 22 that engage the laminae of the stator. The air cools the motor by cooling the ends of the copper wires 18 and the peripheries of the laminae, because the absorption of heat from these elements results in a flow of heat to those elements from the interior of the stator. This flow of heat is quite rapid because the copper wires 18 and the metal laminae are good conductors of heat.

The cooling of the peripheries of the laminae that is taught by this invention, is much more advantageous than the cooling of the ends of the stator as now practiced, because the laminae are insulated from each other by a layer of oxide. This layer of oxide is primarily intended to restrict the flow of electricity from one laminae to another, but it also restricts the flow of heat from one lamina to another. There is, therefore, a sizeable resistance to the longitudinal flow of heat through the laminae of the stator, but there is no sizeable radial restriction to the flow of heat, and heat readily flows to the peripheries of the laminae of the stator.

The passages formed between the outer periphery of the stator and the inner periphery of the housing by the supporting members 20 and 22 can be seen to be relatively short and unobstructed, and therefore, do not require powerful air-moving means 28. The air-moving means 28 give a positive flow of air through the housing and eliminates any "hot spots." Any heat that is generated in the motor will tend to rise to the top of the housing and if permitted to accumulate would overheat the motor. Such accumulation is prevented by the flow of air through the housing because such flow continually removes the heat from the housing as it is generated.

In the drawings and accompanying description, two preferred forms of the invention have been shown and described, but it is obvious to those skilled in the art that various changes may be made in the form of the invention without affecting the scope of the invention.

What I claim is:

1. An electric motor comprising a housing having a substantially cylindrical recess therein, a plurality of supporting members on the surface of said recess that extend axially inward from opposite ends of said recess, a stator supported in said housing by said supporting members, said stator comprising a plurality of annular pieces of sheet metal and being positioned in said recess so the pieces of metal extend transversely of said recess, said members being dimensioned so the inwardly extending ends of the members at the opposite ends of the recess are spaced apart a distance slightly less than the axial length of said stator, a number of said members being provided with recesses that receive a small portion of the end and the periphery of said stator, other of members having portions that receive a small portion of the periphery of said stator, said other members being provided with locking ring recesses adjacent said periphery-receiving portions, a rotor positioned in the said stator that has a pair of air-moving means thereon which are rotatable with the rotor, and openings in said housing for inlet and outlet of air, said supporting members overlying only a portion of said stator and being arranged to form a plurality of short axial air passages and at least one circumferential air passage between the surface of said recess and the outer periphery of said stator, said axial passages being in communication with the said circumferential passage, said circumferential passage being approximately medial of the housing, said motor being arranged so air is drawn into the housing through said inlet by said air moving means, is moved axially inward of the recess from both ends thereof, and is then moved circumferentially along substantially all of the width of the outer periphery of the pieces of metal forming the stator to the outlets in the housing.

2. An electric motor comprising a housing having a substantially cylindrical recess therein, a plurality of supporting members on the surface of said recess that extend axially inward from opposite ends of said recess, a stator supported in said housing by said supporting members, said stator comprising a plurality of annular pieces of sheet metal and being positioned in said recess so the pieces of metal extend transversely of said recess, a number of said members being dimensioned so the inwardly extending ends of the members at the opposite ends of the recess are spaced apart a distance slightly less than the axial length of said stator, at least three of said members extending substantially the full length of said stator, said stator having a plurality of windings that extend axially beyond the ends of the stator, a rotor positioned in the said stator that has a pair of air moving means thereon which are rotatable with the rotor, said air-moving means having portions thereof underlying said windings and portions extending axially beyond said windings, and openings in said housing for inlet and outlet of air, said number of said supporting members overlying only a portion of said stator and being arranged to form a plurality of short axial air passages, said three members being spaced circumferentially of said recess to divide the space between the surface of said recess and the outer periphery of said stator into a plurality of arcuate circumferentially extending air passages with said outlets, each of said arcuate circumferentially extending air passages providing a path for air that is less than 180°, said arcuate circumferentially extending passages being approximately medial of the housing, said motor being arranged so air is drawn into the housing through said inlet by said air moving means, is moved over the portions of said winding that extend beyond the ends of said stator, is moved axially inward of the recess from both ends thereof, and is then moved circumferentially along the outer periphery of the pieces of metal forming the stator to the outlets in the housing.

3. An electric motor comprising a housing having a substantially cylindrical recess therein, a plurality of supporting members on the surface of said recess that extend axially inward from opposite ends of said recess, a stator supported in said housing by said supporting members, said stator comprising a plurality of annular pieces of sheet metal and being positioned in said recess so the pieces of metal extend transversely of said recess, a number of said members being dimensioned so the inwardly extending ends of the members at the opposite ends of the recess are spaced apart a distance slightly less than the axial length of said stator, and at least one of said members extending substantially the full length of said stator, a rotor positioned in the said stator that has a pair of air-moving means thereon which are rotatable with the rotor, and openings in said housing for inlet and outlet of air, said number of said supporting members overlying only a portion of said stator and being arranged to form a plurality of short axial air passages, said one member dividing the space between the surface of said recess and the outer periphery of said stator into a plurality of arcuate circumferentially extending air passages connecting said axial air passages with said outlets, said circumferentially extending passages being approximately medial of the housing, said motor being arranged so air is drawn into the housing through said inlet by said air moving means, is moved axially inward of the recess from both ends thereof, and is then moved circumferentially along substantially all of the width of the outer periphery of the pieces of metal forming the stator to the outlets in the housing.

4. An electric motor comprising a housing having a substantially cylindrical recess therein, a plurality of supporting members on the surface of said recess that extend axially inward from opposite ends of said recess, a stator supported in said housing by said supporting members, said stator comprising a plurality of annular pieces of sheet metal and being positioned in said recess so the pieces of metal extend transversely of the said recess, a number of said members being dimensioned so the inwardly extending ends of the members at the opposite ends of the recess are spaced apart a distance slightly less than the axial length of said stator and at least one of said members extending substantially the length of said stator, said stator having a plurality of windings that extend axially beyond the ends of the stator, a rotor positioned in the said stator that has a pair of air-moving means thereon which are rotatable with the rotor, said air-moving means having portions thereof underlying said windings and portions extending axially beyond said windings, and openings in said housing for inlet and outlet of air, said number of said supporting members overlying only a portion of said stator and being arranged to form a plurality of short axial air passages, said one member dividing the space between the surface of said recess and the outer periphery of said stator into a plurality of short arcuate circumferentially extending air passages connecting said axial air-passages with said outlets, said circumferentially extending passages being approximately medial of the housing, said motor being arranged so air is drawn into the housing through said inlet by said air moving means, is moved over the portions of said winding that extend beyond the ends of said stator, is moved axially inward of the recess from both ends thereof, and is then moved circumferentially along substantially the full width of the outer periphery of the pieces of metal forming the stator to the outlets in the housing.

JAMES L. HAMILTON.